United States Patent [19]
Shimizu et al.

[11] Patent Number: 5,933,301
[45] Date of Patent: *Aug. 3, 1999

[54] MAGNETIC HEAD DEVICE

[75] Inventors: Tetsuo Shimizu; Masayuki Fujimura, both of Chichibu, Japan

[73] Assignee: Canon Denshi Kabushiki Kaisha, Saitama-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/792,549

[22] Filed: Feb. 11, 1997

[30] Foreign Application Priority Data

Feb. 16, 1996 [JP] Japan .................................. 8-028781
Jan. 20, 1997 [JP] Japan .................................. 9-007094

[51] Int. Cl.⁶ .................................................. G11B 15/60
[52] U.S. Cl. ........................................................ 360/130.21
[58] Field of Search .......................... 360/130.21, 130.31

[56] References Cited

U.S. PATENT DOCUMENTS 4,750,066  6/1988  Kunze ........................................ 360/104
4,894,737  1/1990  Hamana et al. ...................... 360/130.31
5,202,808  4/1993  Saito .................................... 360/130.21
5,737,158  4/1998  Tanaka et al. ...................... 360/130.21

FOREIGN PATENT DOCUMENTS 2205988  12/1988  European Pat. Off. ................ 360/105
000549020  6/1993  European Pat. Off. ................ 360/105

*Primary Examiner*—Allen T. Cao
*Attorney, Agent, or Firm*—Fitzpatrick, Cella, Harper & Scinto

[57] ABSTRACT

A magnetic head device includes a magnetic head for magnetically recording information on and/or reproducing information from a magnetic tape, a first pair of tape guides, each of which is formed as a single part and fixed to side surfaces on both sides of the magnetic head in a magnetic tape running direction, and a guide unit including (i) a second pair of tape guides which are independent of the first pair of tape guides and are arranged on the outside of the first pair of tape guides along the magnetic tape running direction and (ii) an opening portion to insert the magnetic head to which the first pair of tape guides is fixed in an almost center portion in the magnetic tape running direction. The guide unit and the second pair of tape guides are formed as one unit, and the magnetic head, in which an azimuth adjustment was performed in the opening portion and to which the first pair of tape guides is fixed, is fixed to the opening portion.

16 Claims, 3 Drawing Sheets

MAGNETIC HEAD DEVICE

BACKGROUND OF THE INVENTION

1. Field of the Invention

The invention relates to a magnetic head device comprising a magnetic head for magnetically recording information on and/or reproducing information from a magnetic tape, and tape guides, each for restricting a running position of the magnetic tape and, more particularly, to a magnetic head device in which there is no need to perform an azimuth adjustment when a magnetic head device is assembled into a mechanism portion of a magnetic recording and reproducing apparatus.

2. Related Background Art

Hitherto, a magnetic head device in which there is no need to perform an azimuth adjustment when the magnetic head device is assembled into a mechanism portion of an apparatus such as a cassette tape recorder or the like has been proposed in U.S. Pat. No. 5,202,808.

FIG. 4 is a perspective view showing a magnetic head device to which the technique disclosed in the above-noted patent is applied.

The magnetic head device is used for a cassette tape recorder and is constructed by a magnetic head 101 and a guide unit 102. The guide unit 102 is constructed by integrally forming a first pair of tape guides 103 which are arranged so as to be adjacent to the side surfaces on both sides in the running direction of a magnetic tape and a second pair of tape guides 104 which are arranged on the outside of the tape guides 103. The magnetic head 101 is fitted and fixed into an opening portion 102a formed in the center portion of the guide unit 102 in the magnetic tape running direction. The tape guides 103 are inserted into a head inserting opening portion 200 of a cassette half together with the magnetic head 101 upon recording or reproduction. The tape guides 104 are inserted into right and left small windows 210 of the cassette half.

In the above construction, when the magnetic head 101 and guide unit 102 are fixed before assembling into the cassette tape recorder, the guide unit 102 is previously positioned. A magnetic tape 105 is run along two arm-shaped guide portions 103a and 104a of the tape guides 103 and 104. An azimuth of the magnetic head 101 is adjusted in accordance with an azimuth adjustment signal of the magnetic tape, thereby positioning the magnetic head 101 and fixing the magnetic head to the guide unit 102 by an adhesive agent. Thus, an azimuth adjustment when assembling the above component elements into a mechanism portion of the tape recorder is unnecessary.

In the above conventional technique, however, since the four tape guides are integratedly formed as a guide unit 102, dimensional precisions at four positions have to be fairly severely set and it is very difficult to manufacture the guide unit. Specifically speaking, hitherto, such a kind of guide unit is made of plastic and there is a concern that of a dimensional variation will occur with every molding lot. It is, therefore, difficult that a straightness at a relative position of the four guides, which exert an influence on a running stability of a tape, are accurately held constant. When the precision of the straightness is low, an edge of the magnetic tape which runs along the four tape guides comes into contact with the guide portions of the tape guides, so that curling of or damage to the tape occurs.

Since the magnetic head 101 is assembled into the guide unit 102 in which the four guides are integrally formed, a total width dimension L in the tape running direction of the magnetic head 101 and tape guides 103 which enter the head inserting opening portion 200 of the cassette half is large. Particularly, when the guide unit 102 is made of plastic, a certain degree of thickness is needed for the tape guides 103 and there is a tendency such that the width dimension L increases. Therefore, when the magnetic head 101 and tape guides 103 are inserted into the head inserting opening portion 200 of the cassette half, there is a concern that a problem will occur such that the guides 103 collide with the edges of the opening portion 200 and cannot be inserted.

SUMMARY OF THE INVENTION

It is an object of the invention to provide a magnetic head device comprising such a kind of magnetic head and four tape guides, wherein the device has a construction such that there is no need to perform an azimuth adjustment when the device is assembled into an apparatus such as a cassette tape recorder or the like and a straightness of a relative positional relation of four tape guides can be obtained at a high precision and a thickness of a first pair of tape guides which are arranged on the side surfaces on both sides in the tape running direction of the magnetic head can be made thin.

To accomplish the above object, according to an embodiment of the invention, there is provided a magnetic head device comprising:

(a) a magnetic head for magnetically recording information on and/or reproducing information from a magnetic tape;

(b) a first pair of tape guides which are respectively formed as single parts and are fixed to side surfaces on both sides of the magnetic head in a magnetic tape running direction; and (c) a guide unit which is formed by integrally constructing a second pair of tape guides which are arranged on the outside of the first pair of tape guides along the magnetic tape running direction and in which an opening portion to insert the magnetic head to which the first pair of tape guides are fixed is formed in an almost center portion in the magnetic tape running direction, wherein the magnetic head in which the azimuth adjustment was performed in the opening portion and to which the first pair of tape guides are fixed is fixed to the opening portion.

According to another embodiment of the invention, there is provided a method of manufacturing a magnetic head device, comprising the steps of:

(a) fixing a first pair of tape guides to both side surfaces of a magnetic head in a tape running direction;

(b) loosely inserting the magnetic head to which the first pair of tape guides are fixed into an opening portion formed in an almost center portion of a guide unit in the magnetic tape running direction and performing an azimuth adjustment, wherein in the guide unit, a second pair of tape guides which are arranged on the outside of the first pair of tape guides along the magnetic tape running direction are integrally constructed; and (c) after completion of the azimuth adjustment, fixing the magnetic head to the opening portion of the guide unit.

The above and other objects and features of the present invention will become apparent from the following detailed description and the appended claims with reference to the accompanying drawings.

DETAILED DESCRIPTION OF THE PREFERRED EMBODIMENT

An embodiment of the invention will now be described hereinbelow with reference to the drawings.

Figure 1:
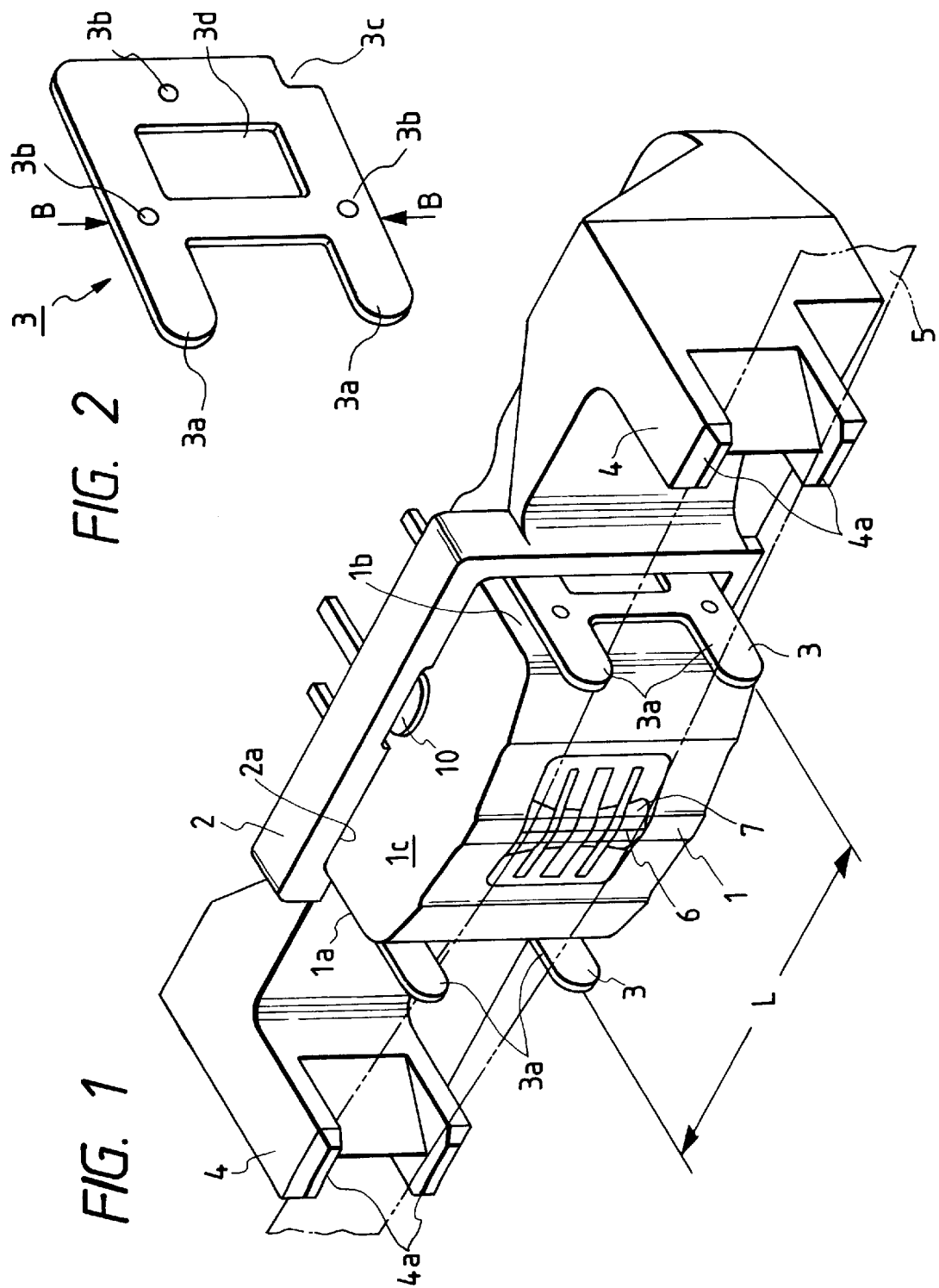
FIG. 1 is a perspective view showing an external view of a magnetic head device according to an embodiment of the invention.

FIG. 1 is a perspective view of an assembling state of a magnetic head device of the embodiment. The magnetic head device is used for a cassette tape recorder and is constructed by: a magnetic head 1; a first pair of tape guides 3 which are respectively formed as single parts and are fixed to the side surfaces on both sides of a magnetic tape 5 of the magnetic head 1 in the running direction; and a guide unit 2 in which a second pair of tape guides 4 which are arranged on the outside of the tape guides 3 along the magnetic tape running direction are integrally formed.

Figure 2:
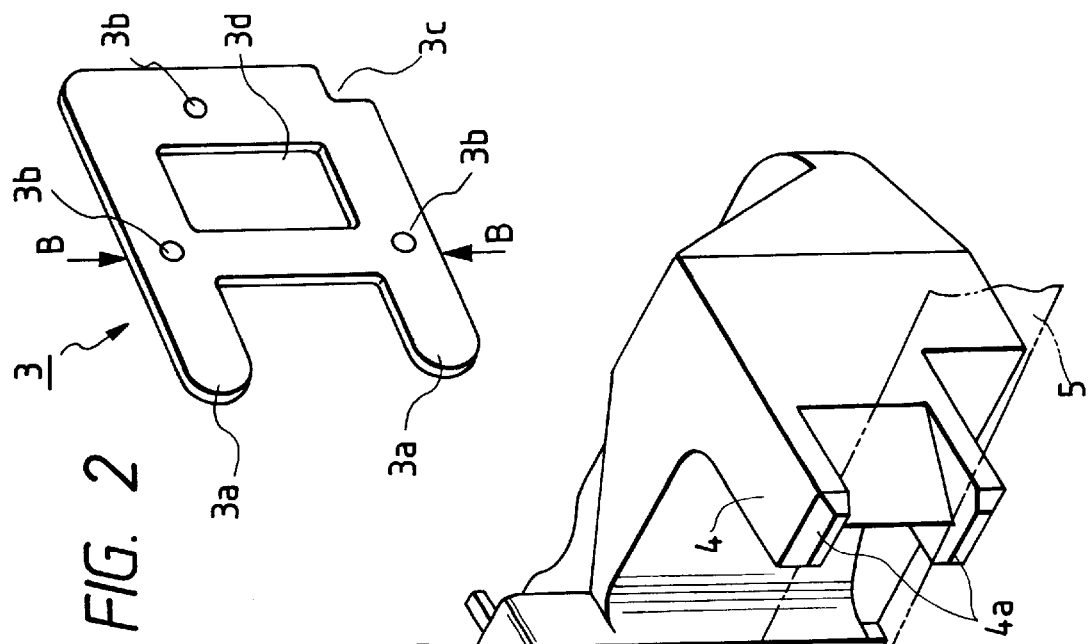
FIG. 2 is a perspective view showing a first pair of tape guides which are used in the embodiment.

A shape of tape guide 3 is shown in detail in FIG. 2. The tape guide 3 is formed in a shape having two arm-shaped guide portions 3a from a metal plate. As shown in FIG. 1, the guide portions 3a are arranged toward the tape sliding surface side and are fixed to two side surfaces 1a and 1b at front and rear positions in the tape running direction of the magnetic head 1. In the embodiment, since the guides 3 are fixed to the magnetic head 1 by spot welding, embosses 3b for the spot welding are formed in the guide 3 at total of three positions, with two positions being in the tape width direction and one position being on the side opposite to the guide portion 3a. The reason why the embosses are formed at three positions is to certainly fix the guide 3 to the magnetic head 1 by a small number of embosses. The embosses 3b are projected toward the magnetic head 1 side. As a method of fixing the guide 3 to the magnetic head 1, it can be fixed by a screw, an adhesive agent, or the like. In the embodiment, however, the foregoing spot welding is used because of its easiness and accuracy of the fixing.

When the guide 3 is fixed to the magnetic head 1, in order to discriminate the projecting direction of the emboss 3b (front/back side of the guide 3), a notch 3c is formed in each of the corner portions on the side opposite to the positions where the guide portions 3a are formed. Further, an opening portion 3d is formed in the guide 3 in order to convey the guide 3 and hold at an accurate position for the magnetic head 1 which was separately conveyed and positioned. Therefore, by using the notch 3c and opening portion 3d, the guide 3 can be fixed to the magnetic head 1 on an automated line.

Figure 3A:
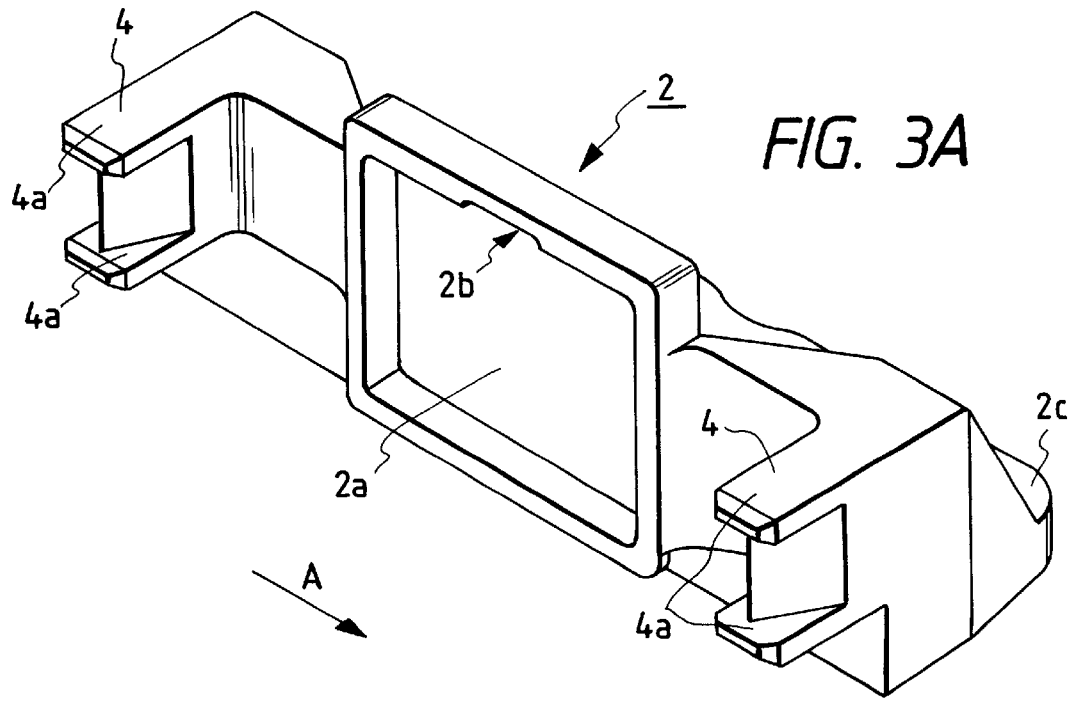
FIG. 3A is a perspective view showing a guide unit which is used in the embodiment.
Figure 3B:
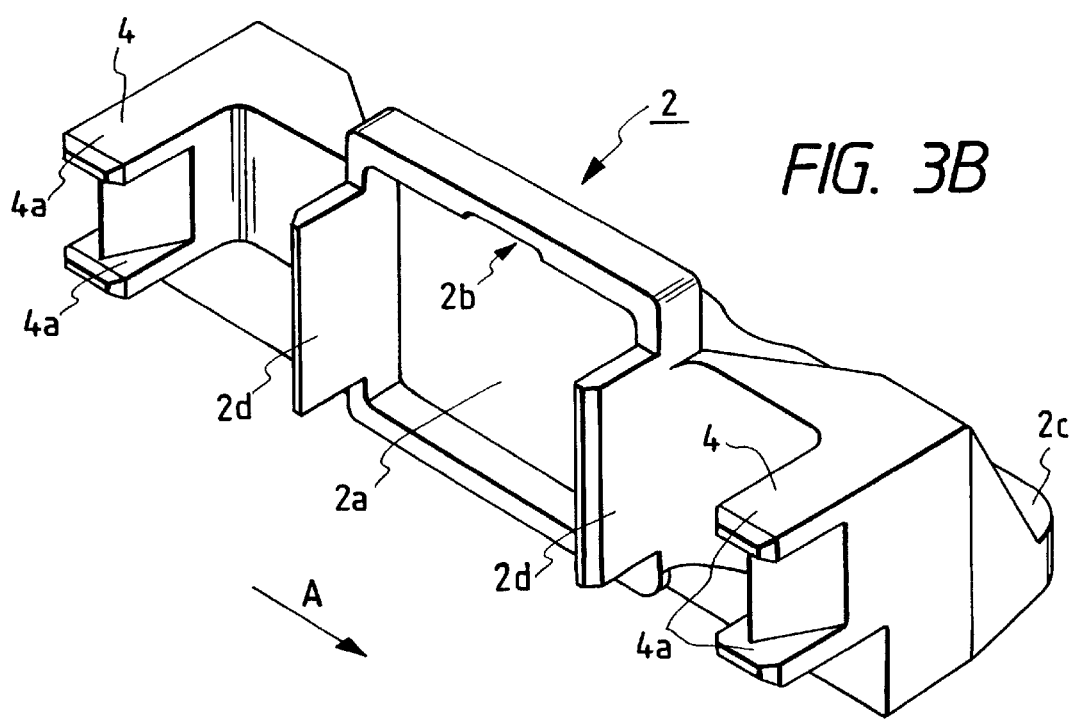
FIG. 3B is a perspective view of a guide unit obtained by improving the guide unit shown in FIG. 3A.
Figure 4:
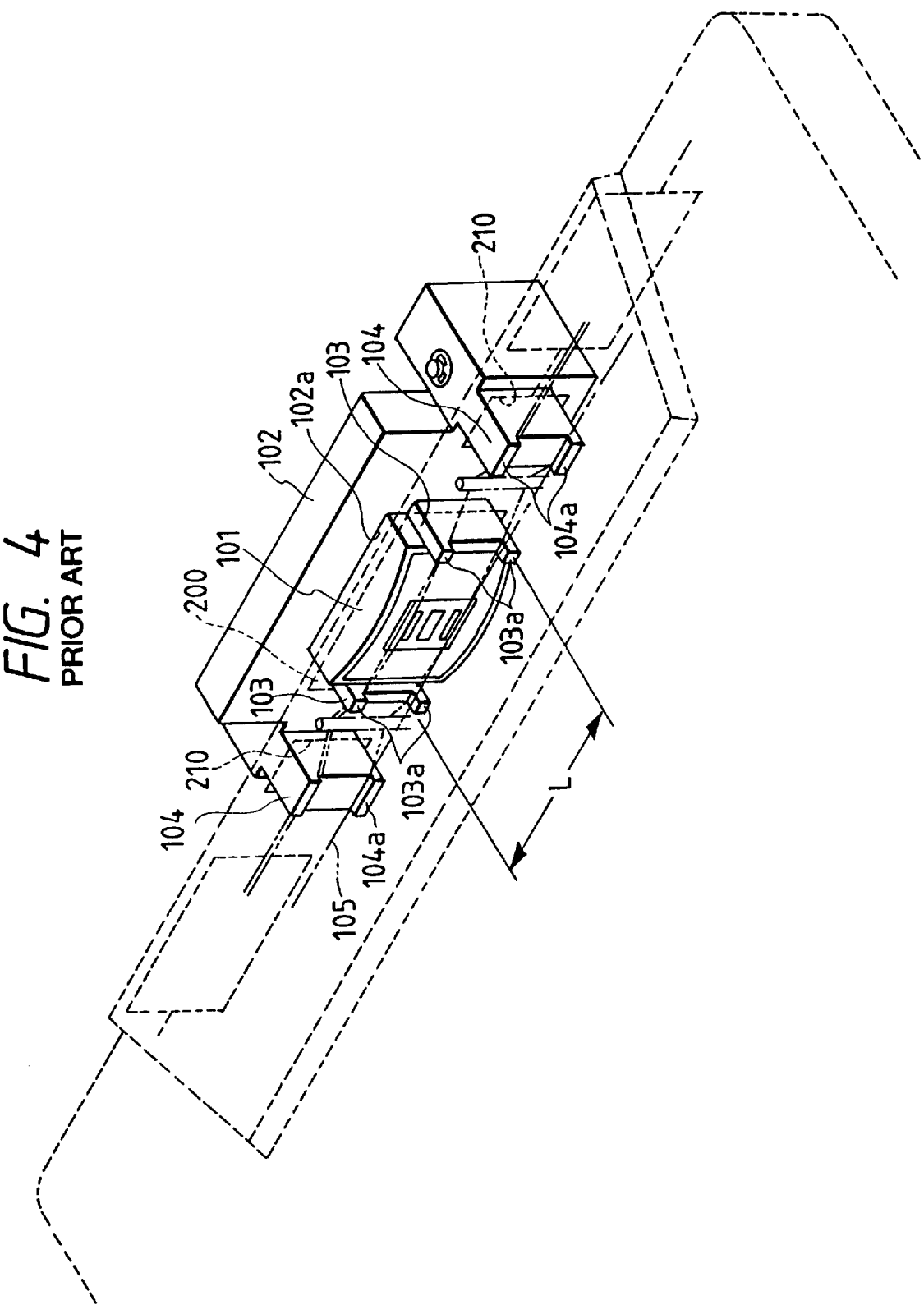
FIG. 4 is a perspective view showing an external view of a conventional magnetic head device.

The guide unit 2 is shown in detail in FIGS. 3A and 3B. The guide unit 2 is integrally molded from plastic. Each of the tape guides 4 formed in the guide unit 2 is also formed in a shape having two arm-shaped guide units 4a. An opening portion 2a to insert and fix the magnetic head 1 to which the tape guides 3 are fixed is formed in the center portion in the magnetic tape running direction (arrow A) of the guide unit 2. Dimensions in both directions of the opening portion 2a are set so that necessary clearances also can be obtained in both of the tape running direction and the tape width direction in a state in which the magnetic head 1 to which the tape guides 3 are fixed is inserted in a manner such that an azimuth adjustment and a position adjustment, which will be explained hereinafter, can be performed.

A notch 2b to avoid a ground terminal 10 fixed to one side surface 1c in the tape width direction of the magnetic head 1 shown in FIG. 1 by spot welding is formed in the opening portion 2a of the guide unit 2. By forming the notch 2b, even if the ground terminal 10 is fixed to the magnetic head side surface 1c, a gap between the magnetic head side surface 1c and the edge surface of the opening portion 2a is not increased more than is needed. It is also possible to easily fix the components by an adhesive agent after completion of the azimuth adjustment. In the tape running direction, since the guides 3 shown in FIG. 2 are fixed to the side surfaces of the magnetic head 1, a large adhesion area between the guide 3 and the edge surface of the opening portion 2a of the guide unit 2 can be obtained, so that there is no need to particularly form a notch for the guide 3.

Although not shown in particular, two opening portions to fix the magnetic head device to an apparatus such as a tape recorder or the like by screws are formed in a protruding portion 2c of the guide unit 2.

An embodiment of a guide unit obtained by improving the guide unit shown in FIG. 3A will now be described with reference to FIG. 3B. Referring now to FIG. 3B, in the guide unit 2 of the embodiment, edge portions 2d of the opening portion 2a in the tape running direction are formed so as to be projected to the medium slide surface side of the magnetic head 1. With such a shape, when the magnetic head 1 to which the guides 3 are fixed is adhered to the guide unit 2, the guide 3 shown in FIG. 2 is adhered to a region shown by arrows B—B. An adhesive area can be increased larger than that in a case of the shape before the improvement and an adhesive strength between the magnetic head 1 to which the guides 3 are fixed and the head unit 2 can be enhanced.

An assembly of the magnetic head device will now be described. First, on the side surfaces 1a and 1b on both sides in the magnetic tape running direction of the magnetic head 1, the tape guides 3 are positioned by setting a magnetic gap 6 of a magnetic core 7 of the magnetic head 1 to a reference and are fixed by spot welding. The fixing by the spot welding can be performed on the automated line as mentioned above by setting the guide 3 according to the embodiment to the shape shown in FIG. 2.

The magnetic head 1 in which the tape guides 3 are fixed on both sides is subsequently inserted into the opening portion 2a of the guide unit 2, the magnetic tape 5 is run, and the track position and the azimuth of the magnetic head 1 are optimally adjusted. In this instance, the position and inclination of the guide unit 2 have to be adjusted so that the magnetic tape 5 runs along the guide portions 4a of the tape guides 4 without coming into contact therewith. Unless they are adjusted so that the tape 5 runs at the optimum position, the tape 5 comes into contact with the guide portions 4a and a curling or the like occurs and the correct azimuth adjustment cannot be performed.

In this state, the track position and azimuth of the magnetic head 1 are adjusted. Upon adjustment, since the tape guides 3 are fixed to the magnetic head 1, the position and azimuth of the magnetic head 1 can be adjusted so as to prevent a situation such that the tape 5 comes into contact with the guide portions 3a and a curling or the like occurs.

After the track position and azimuth of the magnetic head 1 were adjusted as mentioned above, the magnetic head 1 is fixed to the guide unit 2 by adhesive. According to the magnetic head device assembled as mentioned above, since the foregoing azimuth adjustment has been performed, the azimuth adjustment when assembling into a mechanism portion of the tape recorder is unnecessary.

According to the embodiment as mentioned above, a straightness of the relative position of the tape guides 3 and 4 can be obtained at a high precision and the azimuth adjustment can be performed so that the tape 5 can run in a manner such that the tape 5 comes into contact with each guide portion and curling or damage doesn't occur. Since there is no problem on straightness, the guide unit 2 can be easily manufactured and the costs can be reduced.

Since the tape guides 3 are constructed as single parts separately from the guide unit 2, for example, they can be formed as simple parts obtained by pressing a metal plate. Therefore, as a thickness, it is sufficient to set it to about 0.3 mm. Even if the tape guides 3 are fixed to both sides of the magnetic head 1, a width dimension L in the tape running direction of the head portion is increased by only 0.6 mm. For example, it is a main stream at present that the width dimension L of a magnetic head for a car stereo system is equal to 11.4 mm. Even if a width of 0.6 mm is added to such a width of 11.4 mm, the total width dimension L is equal to merely 12.0 mm. As compared with the above construction, according to the device in which four guides are integrally molded and which corresponds to the conventional device of FIG. 2, 13.6 mm is a main stream. There is, consequently, a difference of 1.6 mm between the present invention and the conventional device. Since the tape guides 3 can be made thinner and the width dimension L of the head portion can be reduced, when the magnetic head 1 to which the tape guides 3 are fixed is inserted into the head inserting opening portion of the cassette half, a situation such that the tape guides 3 come into contact with the edges of the opening portion and cannot be inserted can be prevented.

It will be obviously understood that the application of the magnetic head device according to the invention is not limited to the cassette tape recorder.

As will be obviously understood from the above explanation that, according to the invention, the magnetic head device is constructed by: a magnetic head for magnetically recording information on and/or reproducing information from a magnetic tape; and a guide unit constructed by integrally forming a first pair of tape guides which are formed as single parts and are fixed to the side surfaces on both sides in the magnetic tape running direction of the magnetic head and a second pair of tape guides which are arranged on the outside of each of the first pair of tape guides along the magnetic tape running direction, wherein the magnetic head to which the first pair of tape guides are fixed is fixed to the center portion in the magnetic tape running direction of the guide unit. Therefore, by the position adjustment and azimuth adjustment of the tape guides and the magnetic head upon assembly, the azimuth adjustment when the magnetic head device is assembled into the mechanism portion of the apparatus such as a cassette tape recorder or the like can be made unnecessary. The relative position of the first and second pairs of tape guides is adjusted and the straightness can be obtained at a high precision. Therefore, the occurrence of curling or damage by the contact between the magnetic tape and the guide portions of the tape guides can be reduced. Further, the generation of dust due to a peeling-off or the like of magnetic powder in the damage of the magnetic tape also can be reduced and fouling of the magnetic head also can be decreased. The guide units can be easily manufactured and the costs can be reduced.

Further, the first pair of tape guides can be made thin. Thus, for instance, in case of use in the cassette tape recorder, there is obtained an excellent effect such that it is possible to prevent the occurrence of trouble such that when the magnetic head to which the first pair of tape guides are fixed is inserted into the head inserting opening portion of the cassette half, the magnetic head collides with the edge of the opening portion and cannot be inserted.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magnetic head device comprising:

a magnetic head for magnetically recording information on and/or reproducing information from a magnetic tape;

a first pair of tape guides each of which is formed as a single part and fixed to side surfaces on both sides of the magnetic head in a magnetic tape running direction; and a guide unit comprising (i) a second pair of tape guides which are independent of the first pair of tape guides and are arranged on the outside of said first pair of tape guides along the magnetic tape running direction and (ii) an opening portion to insert the magnetic head to which said first pair of tape guides is fixed in an almost center portion in the magnetic tape running direction, wherein said guide unit and said second pair of tape guides are formed as one unit, and wherein the magnetic head, in which an azimuth adjustment was performed in the opening portion and to which said first pair of tape guides is fixed, is affixed to the opening portion.

2. A device according to claim 1, wherein said first pair of tape guides is made from a metal plate and said guide unit is made of plastic.

3. A device according to claim 2, wherein said first pair of tape guides are formed with opening portions for conveyance and positioning upon assembly.

4. A device according to claim 2, wherein said guide unit is fixed to said magnetic head by an adhesive agent.

5. A device according to claim 2, wherein said first pair of tape guides is fixed to said magnetic head by spot welding.

6. A device according to claim 5, wherein said guide unit is fixed to said magnetic head by an adhesive agent.

7. A device according to claim 5, wherein said first pair of tape guides is formed with embosses for the spot welding.

8. A device according to claim 7, wherein said first pair of tape guides is formed with notches to discriminate a front side and a back side.

9. A device according to claim 8, wherein said first pair of tape guides is formed with opening portions for conveyance and positioning upon assembly.

10. A device according to claim 1, wherein a ground terminal is fixed to the side surface of said magnetic head.

11. A device according to claim 10, wherein a notch to avoid said ground terminal is formed in the opening portion of said guide unit.

12. A method of manufacturing a magnetic head device, comprising the steps of:

fixing a first pair of tape guides to both side surfaces of a magnetic head in a tape running direction;

forming, as one unit, a guide unit and a second pair of tape guides, which are independent of the first pair of tape guides and are arranged on the outside of the first pair of tape guides along the magnetic tape running direction;

loosely inserting the magnetic head to which the first pair of tape guides is fixed into an opening portion formed in an almost center portion of the guide unit in the magnetic tape running direction and performing an azimuth adjustment; and after completion of the azimuth adjustment, affixing the magnetic head to the opening portion of the guide unit.

13. A method according to claim 12, wherein the first pair of tape guides is made from a metal plate and the guide unit is made of plastic.

14. A method according to claim 13, further comprising fixing the guide unit to the magnetic head by an adhesive agent.

15. A method according to claim 13, further comprising fixing the first pair of tape guides to the magnetic head by spot welding.

16. A method according to claim 15, further comprising fixing the guide unit to the magnetic head by an adhesive agent.

* * * * *